United States Patent [19]

Bott et al.

[11] Patent Number: 5,173,543

[45] Date of Patent: Dec. 22, 1992

[54] THERMOPLASTIC ELASTOMERS

[75] Inventors: Kaspar Bott, Mannheim; Wolfgang Straehle, Heidelberg; Ulrich Abel, Waldsee, all of Fed. Rep. of Germany

[73] Assignee: BASF Aktiengesellschaft, Ludwigshafen, Fed. Rep. of Germany

[21] Appl. No.: 655,818

[22] Filed: Feb. 15, 1991

[30] Foreign Application Priority Data

Feb. 16, 1990 [DE] Fed. Rep. of Germany ....... 4004881

[51] Int. Cl.$^5$ ...................... C08L 69/00; C08L 75/08; C08G 18/44; C08G 18/48
[52] U.S. Cl. .................................. 525/439; 525/460; 525/462; 525/469; 525/470; 528/76; 528/79; 528/370; 528/372
[58] Field of Search ............... 525/462, 466, 467, 439, 525/460, 469, 470; 528/370, 372, 76, 79

[56] References Cited

U.S. PATENT DOCUMENTS 4,423,205 12/1983 Rajan .
4,456,745 6/1984 Rajan .
4,463,141 7/1984 Robinson .

FOREIGN PATENT DOCUMENTS 0167292 1/1986 European Pat. Off. .
0335416 10/1989 European Pat. Off. .
2726416 12/1978 Fed. Rep. of Germany .

Primary Examiner—James J. Seidleck
Assistant Examiner—Thomas Hamilton, III
Attorney, Agent, or Firm—Oblon, Spivak, McClelland, Maier & Neustadt

[57] ABSTRACT

In thermoplastic elastomers selected from the group consisting of the thermoplastic polyurethanes, of the polyetheresters and of the polyetheramides which are derived from polyetherpolycarbonatediols as diol components, the polyetherpolycarbonatediols used are reaction products of phosgene, dialkyl carbonates having $C_1$–$C_4$-alkyl groups or cyclic carbonates having $C_2$–$C_4$-alkylene bridges or mixtures thereof with mixtures of $a_1$) from 10 to 100 mol % of polyoxytetramethylenediol having a number average molecular weight $\overline{M}_n$ of from 150 to 500 and $a_2$) from 0 to 90 mol % of polyoxyalkylenediols which differ from $a_1$) and have $C_2$–$C_8$-alkylene groups, aliphatic alkanediols of 2 to 14 carbon atoms, alicyclic alkanediols of 3 to 14 carbon atoms or alkylene oxides of 2 or 3 carbon atoms, or mixtures thereof.

6 Claims, No Drawings

THERMOPLASTIC ELASTOMERS

The present invention relates to thermoplastic elastomers selected from the group consisting of the thermoplastic polyurethanes, of the polyetheresters and of the polyetheramides which are derived from polyetherpolycarbonatediols as diol components. The present invention furthermore relates to moldings produced from thermoplastic elastomers of this type as essential components.

Thermoplastic elastomers selected from the group consisting of the thermoplastic polyurethanes, of the polyetheresters and of the polyetheramides are in demand in industry for the production of moldings for various purposes, for example in automotive construction and in the shoe industry.

Polyetherpolyols or polyesterpolyols have usually been used to date as soft phases in these thermoplastic elastomers. For example, U.S. Pat. No. 4,423,205 and U.S. Pat. No. 4,456,745 describe the preparation of polyurethanes using RIM technology, polycarbonatediols obtained from cyclic carbonates being used. Polyurethanes which are prepared from poly(tetramethylene ether) glycol having a narrow molecular weight distribution are described in EP-A-167 292 Polyurethanes which have a polyetherpolycarbonatediol as the diol component are described in U.S. Pat. No. 4,463,141, but the number average molecular weight $\overline{M}_n$ of the polyoxytetramethylenediol used is greater than 500. Polyetherpolycarbonatediols which have aromatic structural units are mentioned in DE-A-2 726 416. EP-A-335 416 describes a carbonate-modified polyoxytetramethylene glycol and its preparations.

However, the stability to hydrolysis, mechanical properties, the oil absorption and the optical properties of the thermoplastic elastomers are not completely satisfactory.

It is an object of the present invention to provide thermoplastic elastomers selected from the group consisting of the thermoplastic polyurethanes, of the polyetheresters and of the polyetheramides having an improved property spectrum.

We have found that this object is achieved, according to the invention, if thermoplastic elastomers selected from the group consisting of the thermoplastic polyurethanes, of the polyetheresters and of the polyetheramides which are derived from polyetherpolycarbonatediols as diol components are employed, wherein the polyetherpolycarbonatediols used are reaction products of phosgene, dialkyl carbonates having $C_1$–$C_4$-alkyl groups or cyclic carbonates having $C_2$–$C_4$-alkylene bridges or mixtures thereof with mixtures of a₁) from 10 to 100 mol % of polyoxytetramethylenediol having a number average molecular weight $\overline{M}_n$ of from 150 to 500 and a₂) from 0 to 90 mol % of polyoxyalkylenediols which differ from a₁) and have $C_2$–$C_8$-alkylene groups, aliphatic alkanediols of 2 to 14 carbon atoms, alicyclic alkanediols of 3 to 14 carbon atoms or alkylene oxides of 2 or 3 carbon atoms, or mixtures thereof.

We have furthermore found moldings produced from thermoplastic elastomers of this type as essential components.

The diol component of the novel thermoplastic elastomers is derived from polyetherpolycarbonatediols which are obtained by reacting polyoxytetramethylenediols (also referred to as polytetrahydrofurans or polyoxytetramethylene ether glycols), if necessary as a mixture with the other diols, with phosgene, dialkyl carbonates having $C_1$–$C_4$-alkyl groups or cyclic carbonates having $C_2$–$C_4$-alkylene bridges or mixtures thereof as carbonate components.

The polyoxytetramethylenediol a₁) has a number average molecular weight $\overline{M}_n$ of 150 to 500, preferably from 150 to 400. It can be prepared by catalytic polymerization of tetrahydrofuran by known methods.

If necessary, mixtures of the polyoxytetramethylenediol a₁) with other diols a₂) can also be used. Polyoxyalkylenediols which differ from a₁) and have $C_2$–$C_8$-alkylene groups, in particular $C_2$–$C_4$-alkylene groups, have proven suitable here. Polyoxytetramethylenediols having a higher molecular weight, preferably having number average molecular weights $\overline{M}_n$ of from 650 to 2,000, are preferred. Diols a₂) which have proven particularly suitable are straight-chain or branched alkanediols of 2 to 14 carbon atoms, in particular ethanediol, 1,3-propanediol, 1,2-propanediol, 1,4-butanediol, 1,3-butanediol, 1,5-pentanediol, 1,6-hexanediol, 1,7-heptanediol and 1,8-octanediol. It is also possible to use cycloaliphatic diols of 3 to 14 carbon atoms, preferably 1,4-dihydroxycyclohexane and 1,4-dihydroxymethylcyclohexane, as well as ethylene oxide and propylene oxide. Mixtures of the diols a₂) can also be used.

The mixtures of polyoxytetramethylenediol a₁) and further diols a₂) according to the above description contain from 10 to 100, preferably from 50 to 100, mol % of the polyoxytetramethylenediol a₁).

Preferred carbonate components are dialkyl carbonates having $C_1$–$C_4$-alkyl groups, in particular dimethyl carbonate, diethyl carbonate and dipropyl carbonate. Among the cyclic carbonates having $C_2$–$C_4$-alkylene bridges, ethylene carbonate, 1,2-propylene carbonate and 1,3-propylene carbonate are preferred. It is also possible to use phosgene and mixtures of the compounds stated as carbonate components.

The ratio of polyoxytetramethylenediol a₁), if necessary with further diols a₂), to the carbonate component depends on the desired molecular weight of the polyetherpolycarbonatediol and on the carbonate component used.

In some cases, some of the carbonate used is lost during the reaction, so that the carbonate has to be employed in larger amounts. In the case of phosgene, the excess thereof depends on the amount of phosgene expelled with the hydrochloric acid formed and, in the particularly preferred case of dialkyl carbonates, on whether or not the carbonate used forms an azeotropic mixture with the alcohol formed in the transesterification, the excess being from 0.5 to 50, preferably from 5 to 35, mol %.

The reaction of a₁), if necessary as a mixture with a₂), with the carbonate component is preferably carried out in the presence of catalysts.

The catalysts used may be the conventional transesterification catalysts, such as tetraisopropyl orthotitanate, dibutyltin oxide, dibutyltin laurate and zirconium-(IV) acetylacetonate, and alkali metal alcoholates, for example sodium methylate, potassium methylate, sodium ethylate and potassium ethylate. The amount of catalyst is from 0.001 to 2%, preferably from 0.01 to 0.5%, based on the total amount of the starting materials.

The reaction components are preferably heated to the boil with the catalyst, and, where dialkyl carbonates are used, the corresponding alcohol formed or the azeotropic mixture of carbonate and alcohol can be separated off by distillation. The transesterification generally takes place at from 20° to 250° C., preferably from 40° to 200° C. If phosgene is used, temperatures of from 0° to 100° C., preferably from 20° to 80° C., can be employed. In this case, a base, for example pyridine or triethylamine, is preferably added to the reaction mass to neutralize the resulting hydrochloric acid.

Where an alkali metal alcoholate is used as the catalyst, a reaction temperature of from 20° to 150° C. is preferred, in particular from 40° to 80° C., the catalyst being separated off by neutralizing it with an acid, such as phosphoric acid, and removing the precipitated alkali metal salt of the relevant acid.

Where tetraisopropyl orthotitanate is used as the catalyst, a reaction temperature of from 40° to 250° C. is preferred, in particular from 100° to 200° C., and the excess catalyst can be deactivated after the reaction is complete, for example by adding phosphoric acid.

The reaction can be carried out at atmospheric, reduced or superatmospheric pressure. Reduced pressure of from 0.1 to 5 mbar is usually applied at the end of the reaction to remove the final residues of relatively low boiling constituents. The reaction is complete when relatively low boiling constituents no longer distill over.

The polyetherpolycarbonatediols formed have a number average molecular weight $\overline{M}_n$ of from 350 to 12,000, in particular from 500 to 6000.

The thermoplastic polyurethanes, the polyetheresters and the polyetheramides are prepared by conventional processes known per se to the skilled worker, polyetherpolycarbonatediols obtained, as stated in the above description, by reacting a carbonate component with $a_1$) and, if required, with $a_2$) being used as the diol component for the soft phase. For further details, reference may be made to the relevant literature.

In the case of the thermoplastic polyurethanes, polyetherpolycarbonatediols are reacted in a known manner with organic polyisocyanates and chain extenders, and both the one-shot procedure (i.e. all three components are reacted simultaneously) and the prepolymer procedure (i.e. a prepolymer of polyetherpolycarbonatediol and polyisocyanate is reacted with the chain extender) may be used.

Suitable polyisocyanates are all conventional polyisocyanates which are used for thermoplastic polyurethanes, such as diphenylmethane 4,4'-diisocyanate, toluylene 2,4-diisocyanate, toluylene 2,6-diisocyanate, naphthalene diisocyanate, hexamethylene diisocyanate, isophorone diisocyanate, 2-(3-isocyanatopropyl)-cyclohexyl isocyanate and diphenylmethane 4,4'-diisocyanate which is hydrogenated in the nucleus, and mixtures thereof.

The chain extenders used are likewise known and are usually employed for the preparation of thermoplastic polyurethanes. Examples are diols, diamines, dithiols, mercapto alcohols, amino alcohols and amino thiols having $C_2$–$C_9$ groups or mixtures thereof, in particular ethylene glycol, 1,3-propanediol, 1,4-butanediol, 1,5-pentanediol, 1,6-hexanediol, 1,7-heptanediol, 1,8-octanediol, 1,9-nonanediol, neopentylglycol, but-2-en-1,4-diol, but-2-yne-1,4-diol, 2-butyl-2-ethyl-1,3-propanediol, 2-aminopropan-1-ol or 3-amino-2,2,-dimethylpropanol; further examples are diols, diamines and dithiols having $C_3$–$C_{14}$-cycloalkyl groups, which may be substituted by $C_1$–$C_4$-groups, and mixtures thereof, preferably cyclohexane dimethanol; and aromatic and heterocyclic compounds, such as hydroquinone, resorcinol, p-cresol, p-aminophenol, 2,7-dihydroxynaphthalene, 4,4'-dihydroxybiphenyl and 4,5-bis-(hydroxymethyl)-2-methylimidazole.

The conditions for the reaction of polyisocyanates, polyetherpolycarbonatediols and chain extenders are known; in general, the reaction is carried out at from 50° to 300° C.

Processes for the preparation of polyetheresters and polyetheramides are described in, for example, Chimica 28, 9 (1974), pages 544 et seq. and in Journal Macromol. Sci. A1 (4) (1967), 617–625.

The novel thermoplastic elastomers possess transparency, improved resistance to oil swelling and good mechanical properties.

EXAMPLES

The determination of the OH number and of the number average molecular weight $\overline{M}_n$ in the examples below was carried out as follows:

The number average molecular weight $\overline{M}_n$ was calculated from the OH number ($\overline{M}_n$ = 112200/OH number). The OH number was determined by potentiometric titration by the PSA method.

EXAMPLE 1

Preparation of the polyetherpolycarbonatediols a) 1,750 g (7.23 mol) of polyoxytetramethylenediol having $\overline{M}_n$ 242 and 743 g (6.3 mol) of diethyl carbonate were heated to the boil with 12.5 g (0.5%) of tetraisopropyl orthotitanate, and the resulting ethanol was distilled off from the unconverted diethyl carbonate in a distillation column having a packed height of 25 cm and containing 5 mm stainless steel nets as packing, under atmospheric pressure at a reflux ratio of 4:1. The reaction was carried out at 180° C. To remove the relatively low boiling constituents, a reduced pressure of 0.3 mbar (30 Pa) was applied.

Yield: 1,912 g
$\overline{M}_n$ = 1,753
OH number = 64.

b) The preparation of the polyetherpolycarbonatediol was carried out similarly to Example 1a, 2,000 g (8.3 mol) of polyoxytetramethylenediol having $\overline{M}_n$ = 242, 743 g (6.3 mol) of diethyl carbonate and 13.7 g (0.5%) of tetraisopropyl orthotitanate being used.

Yield: 2,162 g
$\overline{M}_n$ = 975
OH number = 115.

c) Comparative Experiment 2,925 g (4.5 mol) of polyoxytetramethylenediol having $\overline{M}_n$ = 649, 372 g (3.15 mol) of diethyl carbonate and 16.5 g (0.5%) of tetraisopropyl orthotitanate were reacted as described in Example 1a.

Yield: 3,007 g
$\overline{M}_n$ = 1,968
OH number = 57.

EXAMPLE 2

Preparation of the Thermoplastic Polyurethanes

The particular polyetherpolycarbonatediol (or the polyoxytetramethylenediol in Comparative Example 2d) for which the catalyst was deactivated by adding phosphoric acid was dried for one hour at 110° C. and at 2 mbar, butanediol was added, the mixture was brought to 70° C. and a melt of diphenylmethane 4,4'- diisocyanate, heated to 65° C., was added while stirring. After the reaction mixture had reached 120° C., it was poured onto a sheet at 125° C.

Table 1 summarizes the starting materials, the amounts used and the properties of the thermoplastic polyurethanes prepared.

The swelling in oil was determined by absorption of ASTM-3 oil after storage for 15 days at 100° C.

All types have a Shore D hardness of from 59 to 60 (DIN 53505).

The tensile strength was determined according to DIN 53455.

$C_2$-$C_4$-alkylene bridges or mixtures thereof with mixtures of
- a₁) from 10 to 100 mol % of polyoxytetramethylenediol having a number average molecular weight $\overline{M}_n$ of from 150 to 242 and
- a₂) from 0 to 90 mol % of polyoxyalkylenediols which differ from a₁) and have $C_2$-$C_8$-alkylene groups, aliphatic alkanediols of 2 to 14 carbon atoms, alicyclic alkanediols of 3 to 14 carbon atoms or alkylene oxides of 2 or 3 carbon atoms, or mixtures thereof.

2. A molding obtained from a thermoplastic elasto-

TABLE 1

| Example | Polyetherpolycarbonatediol (PEPCD) | 1,4-butanediol | Diphenylmethane 4,4'-diisocyanate | Swelling in oil [%] | Tensile strength [N/mm²] | Optical properties |
|---|---|---|---|---|---|---|
| 2a | 1,000 g (0.5704 mol) of PEPCD from Example 1a | 350 g (3.8837 mol) | 1,132 g (4.5255 mol) | 5.2 | 33.8 | transparent |
| 2b | 1,000 g (1.0249 mol) of PEPCD from Example 1b | 350 g (3.8837 mol) | 1247.5 g (4.9848 mol) | 4.8 | 34.4 | transparent |
| 2c (comp.) | 1,000 g (0.5169 mol) of PEPCD from Example 1c | 350 g (3.8837 mol) | 1,117.5 g (4.4656 mol) | 10.8 | 24.7 | opaque nacrous effect |
| 2d (comp.) | 1,000 g (0.5054 mol) of polyoxytetramethylenediol having $M_n$ = 1,979 and OH number = 56.7 | 300 g (3.3289 mol) | 975.1 g (3.8964 mol) | 15.1 | 35.0 | opaque nacrous effect |

The results show that the novel thermoplastic elastomers have improved swelling in oil, tensile strength and optical properties (transparency) compared with those containing polyetherpolycarbonatediols based on polyoxytetramethylenediol having $\overline{M}_n = 649$, and greatly improved swelling in oil and transparency compared with corresponding thermoplastic polyurethanes based on polyoxytetramethylenediol having $\overline{M}_n = 1,979$.

We claim:

1. A thermoplastic elastomer selected from the group consisting of the thermoplastic polyurethanes, of the polyetheresters and of the polyetheramides which are derived from polyetherpolycarbonatediols as diol components, wherein the polyetherpolycarbonatediols are reaction products of phosgene, dialkyl carbonates having $C_1$-$C_4$-alkyl groups or cyclic carbonates having mer as claimed in claim 1 as an essential component.

3. A thermoplastic elastomer as claimed in claim 1, wherein said aliphatic alkanediol is ethanediol, 1,3-propanediol, 1,2-propanediol, 1,4-butanediol, 1,3-butanediol, 1,5-pentanediol, 1,6-hexanediol, 1,7-heptanediol or 1,8-octanediol.

4. A thermoplastic elastomer as claimed in claim 1, wherein said alicyclic alkanediol is 1,4-dihydroxycyclohexane or 1,4-dihydroxymethylcyclohexane.

5. A thermoplastic elastomer as claimed in claim 1, wherein said dialkyl carbonate is dimethylcarbonate, diethylcarbonate or dipropylcarbonate.

6. A thermoplastic elastomer as claimed in claim 1, wherein said cyclic carbonate is ethylenecarbonate, 1,2-propylenecarbonate or 1,3-propylenecarbonate.

* * * * *